Nov. 30, 1971 S. B. MISENKO 3,623,250

REMINDER INDEX BOX

Filed March 10, 1970

INVENTOR
STEPHEN B. MISENKO
BY

Ely, Golrick & Flynn
ATTORNEYS

United States Patent Office 3,623,250
Patented Nov. 30, 1971

3,623,250

REMINDER INDEX BOX

Stephen B. Misenko, 1350 E. Boston Road,
Broadview Heights, Ohio 44147

Filed Mar. 10, 1970, Ser. No. 18,107
Int. Cl. G09f 3/18
U.S. Cl. 40—16 2 Claims

ABSTRACT OF THE DISCLOSURE

In an open top rectangular card file box with a serially ordered pack of upright form cards, a dependent curved leaf spring attached to the back wall presses the stack against a front wall multiply slot-windowed to display correspondingly located notations on the face of each successively presented front card; aligned front and back wall top edge notches and spring convexity facilitating card manipulation, especially in transferring a front card to the pack back.

The present invention relates to a reminder index box containing a pack of like cards arranged in a serial order of some data carried therein which the user desires for successive display. Thus through a plurality of window slots provided in the front face of the box, data entered at respective locations on each card may be seen as the card occurs in use as the current front card; with bias means urging the pack towards, and hence a currently front card held for ready viewing against the front wall. Conveniently the bias means is a vertical forwardly convexly curved leaf spring attached to the back wall, further advantageously facilitating circulation of the cards kept in good condition and proper order by aiding easy insertion of a card transferred from the front to rearmost position in the pack. Conveniently, a card pack is furnished comprised of like cards printed or locally lined indicating "blanks," places for data entries which will be located in viewing position before the respective slots by the guiding or registering action of the bottom and side box walls.

Though described in terms, for example, of names of persons, personal events and dates thereon to be called to the user's attention, such as birthdays, wedding anniversaries and the like, the combination of appropriate cards and the described box is obviously useful for other data which might analogously be repeatedly used in sequence.

With the invention hereinafter described in a specific embodiment, cards are advantageously first kept pressed against the forward wall viewing windows, are easily manipulated and circulated by transfer of cards successively from foremost to rearmost position and kept in good condition and correct order; and further, if desired, entries may be made using the box face as a template.

Other objects and advantages of the invention will appear from the following description and the drawings wherein.

Figure 1:
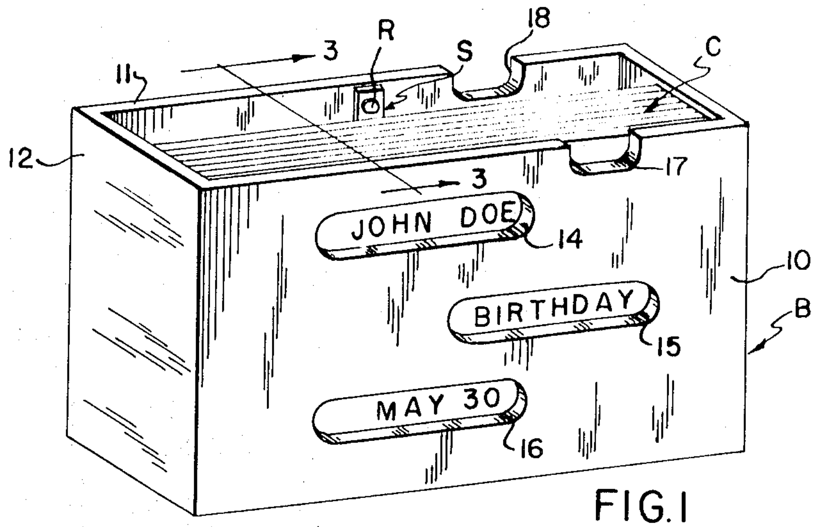
FIG. 1 is a front perspective view showing the box with cards representing one embodiment of the invention.
Figure 2:
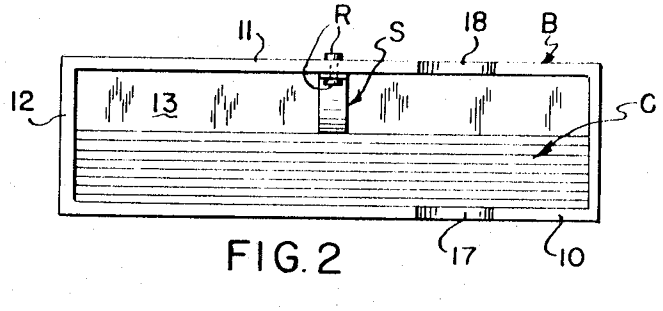
FIG. 2 is a top plan view corresponding to FIG. 1.
Figure 3:
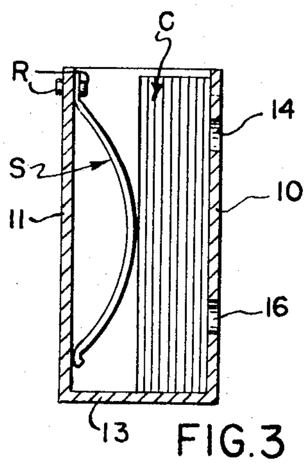
FIG. 3 is a vertical section taken as indicated by the line 3—3 in FIG. 1.

In the drawings there is shown an embodiment of the invention comprising as principal components a rectangular box B of appropriate size and shape to receive a pack of conveniently sized upright cards C such as standard small index or file cards, (here exaggerated in thickness for clarity of representation) and means S for biasing the pack and thereby the foremost card thereof against the inside vertical face of the front wall. The bias means, for example, here takes the form of a leaf spring of flat light spring metal stock, forwardly convexly curved in the vertical plane (see FIG. 3) with its top end secured near the top edge of the box back wall by securing means R such as a rivet through the top back wall margin.

Through a plurality of windows in the form of elongated spaced parallel slots 14, 15, 16 in the box front wall 10 there may be seen respective entries on a foremost card, for example, the name of a person "John Doe," with respect to a pertinent event, such as "birthday" occurring on a date "May 30." In the top edges of the front and back walls, the aligned similar respective notches 17 and 18 reach to a sufficient depth below the top edges of the upright cards to provide ready finger grasp both of the pack as a whole and of a front card to be transferred from back in due order.

The box, of course, may be made of any appropriate material and construction such as stamped sheet metal, molded plastic, wood or the like as may be desired from aesthetic or production considerations, and has the inside dimensions between the front wall 10 and back wall 11 such as to receive a sufficient number of cards for general purposes or a particular use, and between the rectangular side or end walls 12—12, in conjunction with a height above the bottom wall 13, to accommodate preferably one of the standard index card sizes, with a little endwise clearance to obtain easy card insertion while assuring good register or alignment of the data lines with the slots. The box depth preferably is greater than the card height.

The bottom end of the pack biasing spring S is normally but varyingly spaced from the bottom wall 13 and preferably slideably supported by the back wall 11. A forwardly convexly curved intermediate portion representing the major part of the spring length by the spring shaping and mode of securement tends to bow forwardly towards the front wall and thereby apply pressure to a near central back area of the card pack for the stated purpose. The shape of the spring strip preferably is such that its point of stock contact tends to remain at about the horizontal and vertical center of the rearmost card with different pack thickness. Its length is such that not only may a pack consisting of a few cards be held against the forward wall, but also that as more cards are added to the pack thereby tending to diminish the free back space, the lower free end may shift downwardly without encountering the bottom wall, until the intended working pack capacity is reached.

With this arrangement (see particularly FIG. 3), the curved shape of the spring further promotes a smooth, easy insertion of a card at the back because of the downwardly convergent space defined between the back of the pack and the convex top half of the spring itself which latter serves as a card guide.

In addition to a pack of cards supplied as like blank form cards each with imprinted lines designating blank spaces to be filled in appropriately located to align or register with the window slots when the card is in frontmost position, of course simple plain cards also may be used. In latter case, the inclusion of the spring biasing the pack towards the front facilitates manipulation of the pack as a whole in the box with or without finger insertion behind the pack to further support the same, if it desired to use the box window slots as templates through which such entries are made on a foremost card.

I claim:

1. A reminder card index and box comprising:

a rigid card box including parallel equi-sized rectangular front and back walls, joined by narrower walls at three of the remaining four sides and open at the fourth remaining side, a pack of like reminder index cards received edgewise through the open box side and disposed upright therein, and bias means for urging a pack of like cards in upright disposition against said front wall of the box;

said cards each having width and length corresponding to the inside width and length dimensions of the box with a slight edgewise clearance;

said front wall having a plurality of window slots through which may be viewed registering data entered on a foremost card of the card pack in the box;

said front and back walls recessed in their respective opposed edges at said open side by aligned notches to a depth inward of the adjacent edges of said cards thereby enabling finger-grasping of an entire card pack for withdrawal from the box;

said bias means comprising a spring metal strip secured to and centered on the rear wall interior and extending in a direction generally perpendicular to the open side and having, intermediate its ends, a portion forwardly convexly curved to contact the back of the card pack near its center region.

2. A reminder index box as described in claim 1 wherein:

the end of said spring metal strip adjacent to the open side of the box is secured to the back-wall and its opposite end portion is free slideably to bear on said back-wall and has normal endwise clearance from the wall opposite said open side.

References Cited

UNITED STATES PATENTS 2,499,329 2/1950 Potter ............... 40—109

FOREIGN PATENTS 512,386 9/1939 Great Britain.
322,293 6/1957 Switzerland.

ROBERT W. MICHELL, Primary Examiner

W. J. CONTRERAS, Assistant Examiner

U.S. Cl. X.R.

40—64